United States Patent [19]

Joyce

[11] Patent Number: 4,941,190
[45] Date of Patent: Jul. 10, 1990

[54] METHOD AND SYSTEM FOR ENHANCEMENT OF A DIGITIZED IMAGE

[75] Inventor: Terrence H. Joyce, Minneapolis, Minn.

[73] Assignee: Minnesota Mining and Manufacturing Company, St. Paul, Minn.

[21] Appl. No.: 219,377

[22] Filed: Jul. 15, 1988

[51] Int. Cl.⁵ .............................................. G06K 9/36
[52] U.S. Cl. ........................................ 382/54; 382/27; 382/50; 382/52; 358/166; 358/447; 358/464
[58] Field of Search ....................... 382/54, 27, 50, 41, 382/52, 22; 358/166, 167, 160, 284, 36, 447, 463, 464

[56] References Cited

U.S. PATENT DOCUMENTS

| | | | |
|---|---|---|---|
| 4,298,895 | 11/1981 | Arai et al. | 358/463 |
| 4,334,244 | 6/1982 | Chan et al. | 358/166 |
| 4,504,864 | 3/1985 | Anastassiou et al. | 358/36 |
| 4,571,635 | 2/1986 | Mahmoodi | 358/284 |
| 4,612,584 | 9/1986 | George et al. | 358/447 |
| 4,791,678 | 12/1988 | Iwase et al. | 382/54 |
| 4,794,531 | 12/1988 | Morishita et al. | 382/54 |
| 4,825,297 | 4/1989 | Fuchsberger et al. | 358/166 |
| 4,866,290 | 9/1989 | Maehara | 358/464 |

Primary Examiner—Leo H. Boudreau
Assistant Examiner—Yon Jung
Attorney, Agent, or Firm—Donald M. Sell; Walter N. Kirn; William D. Bauer

[57] ABSTRACT

A system and method of modifying pixels supplied to the system that a multiple level signals for a digitized image wherein a moving pixel window with a center pixel, $D_c$, is used from which the annular means, $m_a$, of the center pixel (the mean of the $2^N$ pixel values of the window surrounding the center pixel, where N is an integer of 1 or more) is determined with the center pixel and selected pixels surrounding the center pixel, $D_c$, are used to determine a measure of deviation (center deviation, $\sigma_c$) of the center pixel relative to the center pixel that is used to obtain a modification gain, $f(\sigma_c, C_g)$. The center pixel, $D_c$, its annular mean, $m_a$, and its modification gain, $f(\sigma_c, C_g)$ or $F'(\sigma_c, C_g)$ are used to obtain a modified center pixel value, $D_c40$, in accordance with one of the following equations that are of the form for an algorithm for determining the unsharp marking filter value for an image pixel:

$$D_c' = [f(\sigma_c, C_g) \times (D_c - m_a)] + m_a; \text{ or}$$

$$D_c' = \frac{[f'(\sigma_c, C_g \times (D_c - m_a)]}{2^N} + m_a$$

where N is an integer of 0 or greater.

31 Claims, 7 Drawing Sheets

METHOD AND SYSTEM FOR ENHANCEMENT OF A DIGITIZED IMAGE

FIELD OF THE INVENTION

The invention presented herein relates to a method and system for enhancement of multiple level pixel signals of a digitized image by an unsharp masking treatment wherein a moving window of a number of pixels having a center pixel is used for modifying the central pixel value and for determining a background value for the modified center pixel value for use, when desired, in thresholding the center pixel value to one bit.

BBACKGROUND OF THE INVENTION

As a direct result of microcomputers and word processing systems, many computer output devices that accept digital data and produce hardcopy output have been developed. A large fraction of these devices now use non-impact printing methods, such as ink jet or laser printing. These machines are faster and quieter than impact printers with resolution that is sufficient for letter quality printing.

In a related technology, as the cost of charged coupled device (CCD) image scanning arrays decreases, one can expect the present type of analog photocopying machine to evolve to a more general purpose machine that will digitize the document by scanning to divide the image on the document into picture elements or pixels and provide a digital value that is one of many possible levels for each pixel and then print using the digital data. In addition, the digital data is available for the computer and the computer can output data directly to the print mechanism. This is just one example of new technologies that use digital data.

Using a general purpose computer, digital enhancement techniques can be applied to improve the perceived quality of the image produced from digital signals which define the density of each image element or pixel using as many as, but not limited to, 256 levels. This is not commercially practiced, as the computational load to enhance the document is too time consuming or expensive making it necessary to simplify the algorithms used to reduce the computational loads. A digital document can require upwards of 15 million picture elements (pixels) to define it, so minutes to hours would be needed to enhance the document on a general purpose computer. Specialized image enhancement computers are available, but at a cost of tens to hundreds of thousands of dollars.

In all image forming systems, degradation of the original information occurs which normally manifests itself in two forms—(1) blurring of edges (reduced resolution, lower sharpness) and (2) random irregularities (noise, fog). In normal photographic images it has long been known that edge sharpness can be enhanced and noise reduced by masking the original with a negative unsharp mask of suitable contrast (usually lower than that of the original). Early work by J. A. C. Yule is representative of this photographic masking approach (U.S. Pat. Nos. 2,407,211; 2,420,636; 2,455,849) and more complex approaches are represented by Blearson et al in U.S. Pat. No. 3,615,433. An early attempt to use a raster scan of the image while measuring the instantaneous light values photoelectrically and attenuating the beam according to a predetermined relationship with the light value is disclosed by Folse in U.S. Pat. No. 3,011,395. The rapid development of the Space Program has resulted in the emergence of high efficiency digital means of digitizing, analyzing, reconstituting and enhancing images. Median filtering as a means of enhancing edge contrast has also been studied (e.g. B. R. Frieden JOSA 66. 280–283 (1976)). In the medical radiography field this stimulated the development of computerized tomography and the digital processing of radiographs in general (S. R. Amtey et al, SPIE 207, 210–211 (1979), and C. R. Wilson et al, SPIE 314, 327–330 (1981)). In these approaches the image has been divided into a large number of pixels by scanning A moving window, consisting of n×m pixels centered on pixel i with image value $D_i$, is investigated by an on-line computer as pixels i are scanned. The mean or arithmetic average $\overline{D}$ of the pixels within the window is then used to modify the central pixel value $D_i$ to a filtered value $D_i'$ by the algorithm:

$$D_i' = aD_i - b\overline{D}$$

The parameters a and b are chosen to give specific image characteristics, but are constant over the scan of a single image.

The concept of varying parameters similar to a and b throughout the scan of the image based on certain local properties of the image has been studied and several patents (H. Kato et al U.S. Pat. Nos. 4,315,318 and 4,317,179 and M. Ishida et al U.S. Pat. No. 4,346,409) have disclosed particular relationships between the parameters and the values of $D_i$ or $\overline{D}$ which can give further image enhancement. These techniques do not, however, distinguish between noise and image edges as far as enhancement is concerned, and the higher the image value $D_i$ or $\overline{D}$, the greater the enhancement. In other technology areas, similar approaches have been made. Thus in E. Alparslau and F. Ince IEEE Vol. SMC-11, 376–384 (1981) images are treated with an edge enhancement algorithm based in part on an adaptive parameter determined by the difference between the maximum and minimum pixel values in the window at any point. U.S. Pat. No. 4,334,244 discloses an image enhancement system wherein a running average of a group of digitized samples of a video signal and a median of a group of digitized samples are processed to provide a gradient sample. The gradient sample is scaled according to the noise level of the video signal. The scaled sample gradient is multiplied by the difference between the median and running average samples and added to the average sample to generate an output sample. The output samples are converted into an enhanced video signal. It is known also that analog photographic images can be modified. They can be enlarged, combined, and have the contrast in some areas enhanced and in other areas reduced (smoothed). These same results can be achieved by the digital processing of digital images. In addition, digital image processing can modify images in many important ways that analog processing can not. Edge enhancement, noise filtering, gray scale stretching or compressing, and color correction are a few of the techniques available to digitally improve the perception of an image.

It is known that an image with accentuated edges is often more subjectively pleasing for viewing since it can increase the visual depth perception and in some cases provide more information. Since sharpness is an effect associated with edges, a method that isolates and amplifies edges is needed. Edges represent high frequency components of the image; that is, regions where the intensity of the image is changing more rapidly have higher spatial frequencies. Conversely regions where the image is changing slowly have only low spatial frequencies present.

One known method to extract the high frequency components of the signal is to subtract the low frequency components from the original signal. The resulting high pass filter can be constructed by suitably combining an all pass filter and a low pass filter, as High Pass Filter=All Pass Filter—Low Pass Filter.   (1.1)

Once isolated, the resulting high frequency components can be scaled by multiplying the filter by a factor (k):
$k \times High\ Pass = k \times All\ Pass - k \times Low\ Pass.$   (1.2)

The resulting filter provides image data which has been stripped of the original low frequency components and then must be added back to the image data. This results in an unsharp masking enhancement filter (USM) which can be represented by:

$USM = k \times All\ Pass - k \times Low\ Pass\ 30\ Low\ Pass;\ or$   (1.3)

$USM = k \times All\ Pass - (k-1) \times Low\ Pass.$   (1.4)

Operating repeatedly on the image data with this filter in a prescribed manner will yield enhanced image data.

The foregoing unsharp masking enhancement filter is used by A. B. Mahmoodi and Owen L. Nelson in their U.S. Pat No. 4,571,635, wherein a sliding window, which moves across the image pixel signals in both vertical and horizontal directions, is used to apply the filter to the image pixel signals. Operating on the level or value of the center pixel, $D_c$, of the window as the all pass filter value and using the mean level or value, $\overline{D}$, as the low value with $D_c'$, representing the unsharp masking filter value, equation 1.4 can be written as $D_c' = kD_c - (k-1)\overline{D}$   (2.1)

which is the form for equation (2.4) in U.S. Pat. No. 4,571,635 Mahmoodi et al after it is corrected. The error in equation (2.4) of the patent is due to an error in the expression appearing in column 5, line 30 of the patent which is used to arrive at equation (2.4) of the patent. Line 30 Line 30 indicates $b/1-b=1-k$, which should $-b/1-b=1-k$.

Rearranging equation 2.1, it can be written as $D_c' = k(D_c - \overline{D}) + \overline{D}$   (2.2)

U.S. Pat. No. 4,571,635 to Mahmoodi et al makes the coefficient k adaptive to change in the image scene. Where an edge is crossed, emphasis is desired (large coefficient k) to perform the image edge and contrast enhancement. In areas with no edges the emphasis coefficient is kept to a low level to minimize high spatial frequency noise and smooth the image. The algorithm of the patent controls the emphasis coefficient k with a statistical parameter that can be calculated for the window at any given position. The standard deviation, $\sigma$, of the pixel values within the window is used to produce a function $f(\sigma)$ which is suitable for the determination of k.

Low cost, high speed implementation of the algorithm disclosed in U.S. Pat. No. 4,571,635 to Mahmoodi et al is difficult due to the large number of calculations involved for each pixel signal, the amount of memory image signals required and the lack of specialized integrated circuits currently available. The lack of specialized integrated circuits capable of spatial image processing, as is described in U.S. Pat. No. 4,571,635 means that complex imaging processing algorithms must be carried out by the use of many low level circuit elements. While this results in the use of simple algorithms many circuit boards are required along with bulky power supplies and complicated interconnects. The complexity and cost of implementing the algorithm as disclosed in U.S. Pat. No. 4,571,635 presents a cost/benefit ratio that impedes its possible use in many digital acquisition, transmission or reproduction devices as television sets, microfilm reader/printers, copy machines, facsimile machines, optical character readers and digital still photography cameras. It will be noted that in Example 4 set forth in U.S. Pat. No. 4,571,635 a Digital Equipment Corporation VAX 11/750 computer was used to run a program for an image enhancement process according to the algorithm disclosed in the patent.

One barrier to the practical implementation in hardware of the algorithm as set forth in equation (2.2) is the computational difficulty that is encountered with respect to obtaining the mean level or value $\overline{D}$ for each window. This mean or average for the window is the result obtained by multiplying the center pixel and the surrounding pixels by one, totaling such results, and dividing by the number of pixels in the window, e.g., dividing by nine in the case of a $3 \times 3$ window. Thus, for a $3 \times 33$ window $$D = \frac{1}{9} \sum_{i=1}^{9} D_i,$$   (3.1)

where $D_i$ is the value of the pixel at the various nine locations of a $3 \times 3$ window.

The primary disadvantages in the implementation of the mean equation (3.1) are the division by 9 and the method of calculating the mean or average. The traditional method of dividing by an arbitrary number would involve the development of a special processor to handle the division. This solution is expensive for it involves too much circuitry or consumes too many clock cycles to be of value.

The simplest method of calculating the mean according to equation (3.1) involves holding all nine numbers in memory and adding them one at a time to an intermediate register. When the sum has been accumulated, it is transferred to a divider. The disadvantages in this scheme are: that all numbers must be stored in a register until the sum is generated which requires more bits for representation, and hence the complexity of the adder increases, and division by nine is still necessary.

Another method of calculating the mean according to equation (3.1) would be to sum the numbers in stages. The first stage adds eight elements in pairs with four adders, carrying the last one. The output of this first stage has one more bit than the input. The second stage then sums four of the five remaining numbers, carrying the fifth, and again the output word length has grown by one bit. This continues for four stages of adders, with the final word size four bits larger than the largest input word. The output of the fourth stage is again passed to divide by nine processor. This pipeline method is faster in that as soon as the first stage has finished operating on the input and passed the results to the second stage, it is free to process the next window. The disadvantages are that eight adders are necessary, and at each stage the adders complexity has to increase to handle the progressively larger word size, and one is still faced with the divide by nine problem.

Another barrier to a practical implementation in hardware of the algorithm as set forth in equation (2.2) is the difficulty in implementing the computation of the standard deviation of the pixel value for an image window of arbitrary size which is used for a determination of the coefficient k in the equation.

The standard deviation of an image window gives a measure of the amount of spread of the image window from the mean of the window. In the image processing area this is also a measure of the high frequency components in the image window. In the context of unsharp masking, as in U.S. Pat. No. 4,571,635, the standard deviation and its size regulates the amount of amplification (coefficient k) a given pixel receives.

Currently there are two solutions to the problem of real time calculations of this magnitude. The first solution involves the programming of an expensive computer to perform the necessary calculations. The second solution involves fabricating a dedicated circuit board set to implement the calculation. By cascading several stages of multipliers and accumulators followed by dividers and a block for the square root the standard deviation calculation can be reduced to a few circuit boards. This solution is also costly to implement and integrate into the unsharp masking algorithm.

SUMMARY OF THE INVENTION

The present invention provides an unsharp masking filter based on an algorithm of the general form set forth in equation (2.2), but having modifications which circumvents the aforementioned barriers making its implementation far less complex and less costly than an implementation of equation (2.2).

The invention provides for use of a scanning or moving window having a number of pixels and having a center pixel, $D_c$, wherein the average value of $2^N$ pixels, where N is 1 or greater, surrounding a center pixel for the window of a given center pixel is obtained without using the value of the center pixel, such average value being called the annular mean, $m_a$. Any window having an odd number of rows and columns has a center pixel. Each pixel value for a digitized image, about which the window can be established, is used as a center pixel as the image is scanned by the window. This means, for example, that for a 3×3 window, the annular mean calculation, when all of the pixels surrounding the center pixel are used, requires division by eight, rather than by nine, which greatly simplifies the circuitry required. Using $2^N$ pixels surrounding the center pixel means that none of the pixel values are weighted in the process of determining the annular mean, $m_a$, since each of the $2^N$ pixels are processed in the same manner for arriving at the annular mean. The invention also uses the window for the calculation of the sum of the differences between the center pixel, $D_c$, and a selected number of its surrounding pixels, $D_i$. For a 3×3 window, use of all eight pixels surrounding the center pixels involves the calculation of eight differences which are summed. This calculated value is referred to as the center deviation, $\sigma_c$. Expressed as an equation for a 3×3 window.

$$\sigma_c = \sum_{i=1}^{N} |D_i - D_c|; N = 8 \qquad (4.1)$$

This center deviation calculation is used instead of the standard deviation calculation employed in U.S. Pat. No. 4,571,635 for regulating the value for coefficient k in the equation (2.2). Use of the center deviation calculation instead of the standard deviation greatly reduces the complexity of the circuitry that is required and does not materially degrade the image quality compared to that obtained when using the standard deviation in the determination of the value for k in equation (2.2).

A further simplification of the technique as disclosed in U.S. Pat. No. 4,571,635 is also provided by the present invention. U.S. Pat. No. 4,571,635 used a computer to provide the coefficient k under the control of the calculated standard deviation. The present invention eliminates the need for a computer in that a memory containing a look-up table is provided with the calculated center deviation, $\sigma_c$, plus a gain control input, $C_g$, being used to establish a memory location for the value for the coefficient k. Circuitry is provided for determinating the enhanced or modified value, $D_c'$, for the center pixel of the scanning window in accordance with the following equation $$D_c' = [f(\sigma_o C_g) \times (D_c - m_a)] + m_a \qquad (5.1)$$

which is in accordance with the form for the unsharp masking filter equation (2.2).

The use of the annular mean, $m_a$, and the center deviation, $\sigma_c$, materially simplifies the determination of an enhancement or modified value for an image pixel so that it can be implemented using LSI (large scale integration) circuitry technology.

A further aspect of the present invention is the further utilization of the annular mean, $m_a$, for use in determining the local background which is usable when it is desired that the enhanced or modified data signal for a pixel be used for printing on a bi-level basis, i.e., a mark or no mark. This requires that the enhanced data signal be thresholded to a single bit. Once the local background is estimated, a predication can be made of the threshold to be used for making a comparison with the value of the enhanced pixel signal to determine whether a mark is to be made. If the enhanced pixel value is determined to be greater than the threshold, such pixel value will be used to produce a mark when a positive image is to be produced or not produce a mark when a negative image is desired. An estimate of the background, relative to the pixel for which an enhanced or modified pixel value has been determined, is made using the average of the annular mean values for the modified pixel and for windows centered on a pixel that is a fixed number of consecutive pixels ahead of and behind the modified pixel. An alternative approach uses the average of annular mean values for a fixed number of windows ahead of and behind the pixel in question wherein such windows do not overlap. Both approaches use annular mean values which are close enough to the pixel in question and yet spread far enough apart to provide a valid estimation of the local background. Threshold values that are to be used are available in a look-up table provided in a memory. The background value is used with a contrast control value to select the threshold value that is to be used from the look-up table.

This threshold value and the value of the enhanced pixel are presented to a comparator for determining whether the enhanced pixel exceeds the threshold. The output of the comparator is directed for use by whatever type of device or apparatus is used to produce an image or may be placed in memory for use at a later time. An enhanced pixel value that exceeds the threshold will be used to cause a mark to be produced by the imaging device or apparatus and not cause a mark to be produced when the threshold is not exceeded in the case of positive images.

BRIEF DESCRIPTION OF THE DRAWINGS

The novel features and advantages of the present invention will become more apparent to those skilled in the art upon consideration of the following detailed description which refers to the accompanying drawing wherein.

DETAILED DESCRIPTION

Figure 1:
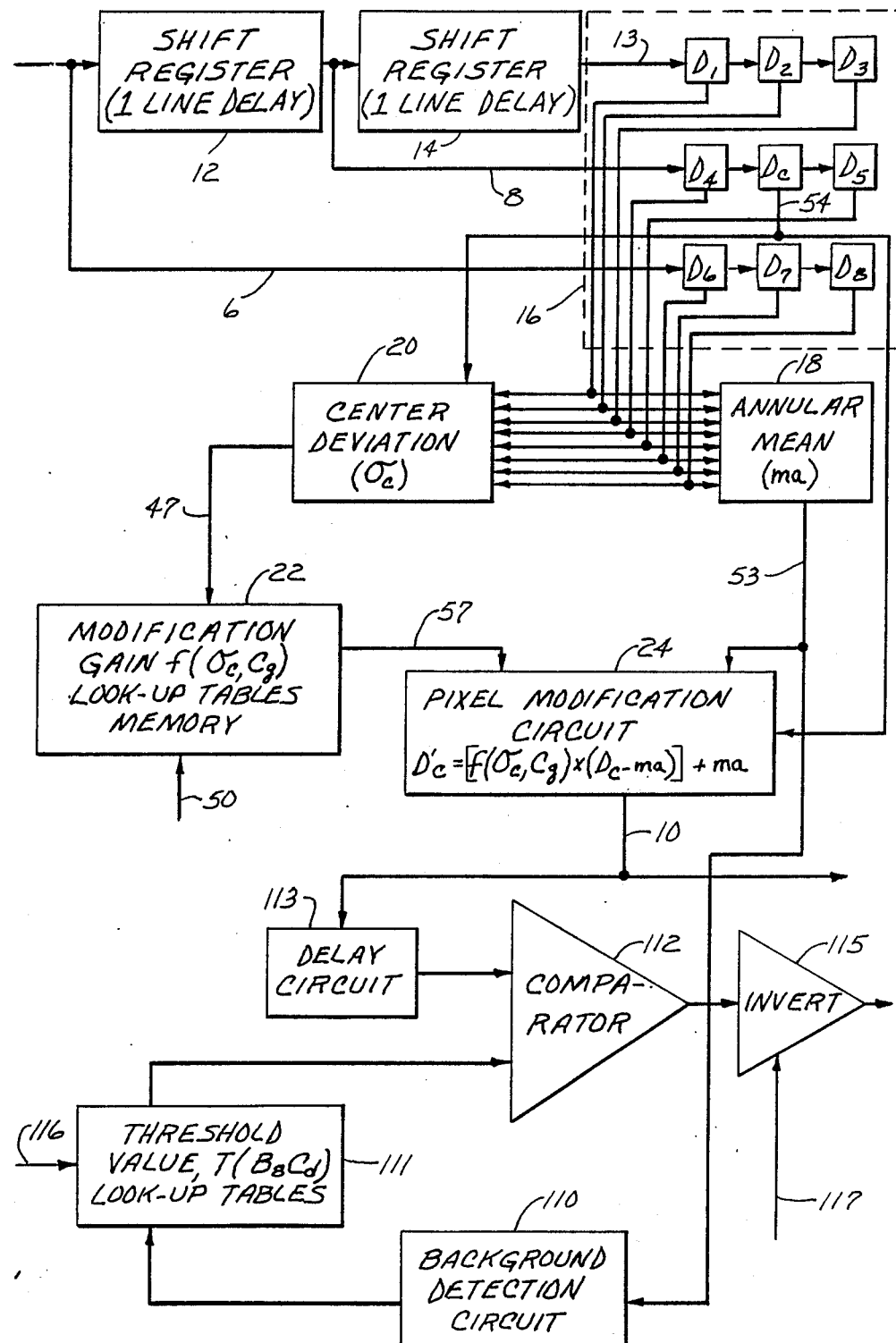
FIG. 1 is the schematic in block diagram form of a pixel enhancement system embodying the invention.

Referring to FIG. 1 of the drawing, a simplified block diagram is shown of a digitized image enhancement circuit which utilizes a moving pixel scanning window, each window having a center pixel wherein $2^N$, where N is 1 or greater, pixels of the pixels surrounding the center pixel are used to provide an enhanced or modified value $D_c'$ at 10 for each center pixel value, $D_c$, of the scanning window, the enhanced or modified center pixel value $D_c'$ being obtained in accordance with the following equation:

$$D_c' = [f(\sigma_c, C_g) \times (D_c - m_a)] + m_a \qquad (6.1)$$

where $f(\sigma_c, C_g)$ s a function of the center deviation, $\sigma_c$, for the window and a gain control, $C_g$, and $m_a$ is the annular mean for the scanning window. Each enhanced pixel value, $D_c'$, is usable to produce an image mark wherein the pixel value determines the density of the image mark. For purposes of illustration, a 3×3 pixel scanning window is used in the arrangement shown in FIG. 1.

The circuit used to produce the enhanced pixel value, $D_c'$, includes shift registers 12 and 14, a window shift register 16, annular mean circuit portion 18, center deviation circuit portion 20, modification gain, $f(\sigma_c, C_g)$ look-up tables memory 22 and a pixel modification circuit portion 24.

The image pixel values in digitized form, 8-bits for each pixel, for example, are serially supplied to the input 6 of window shift register 16 and to the shift register 12, which has a capacity to store one line of the image to provide a delay of one line. Such delay can also be provided by use of an addressable random access memory. The output of the shift register 12 is supplied to the input 8 of window shift register 16 and to shift register 4 which also provides a delay of one line. The output of shift register 14 is supplied to the input 13 of window shift register 16. Referring to the window shift register 16, a pixel value supplied to the input 13 appears at location $D_1$, is then shifted to location $D_2$ and then to location $D_1$, as the shift register 16 is clocked. Similarly, a pixel value supplied to the input 8 of register 16 appears at location $D_4$, then $D_c$ and then location $D_5$. A similar receipt and shifting of a pixel value received at input 6 occurs with respect to locations $D_6$, $D_7$ and $D_8$. Accordingly, with each clock signal a new set of pixel values are presented to make up a window. Each of the locations $D_1$–$D_8$ have an output which is connected to the annular means circuit portion 18 and the center deviation circuit portion 20. The center pixel location $D_c$ of the window shift register 16 has an output 54 for supplying the center pixel value, $D_c$, to the pixel modification circuit portion 24 and to the center deviation circuit portion 20.

Figure 2:
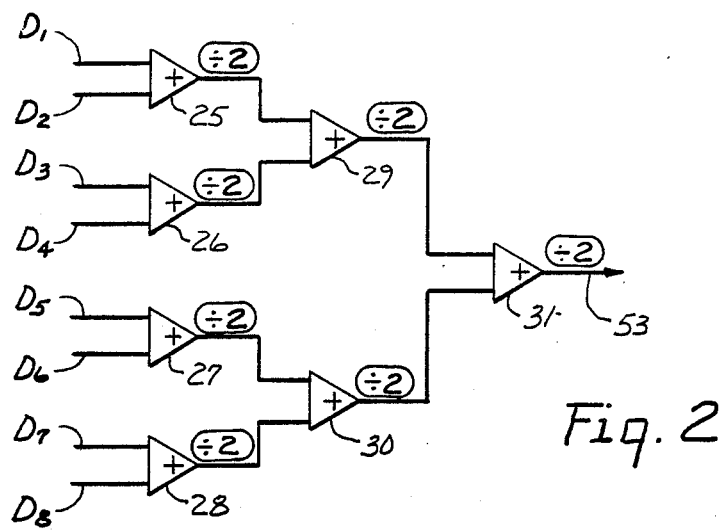
FIG. 2 is a schematic of circuitry usable for the annular mean circuit portion of FIG. 1.

The annular mean ($m_a$) is calculated by the circuit portion 18 for the window 16 that is provided for each center pixel, $D_c$, that is presented with result at output 53 being provided to the pixel modification circuit portion 24. The annular mean is the average value of $2^N$ pixels of the pixel window 16, where N is 1 or greater, which surround a given center pixel without using the value of the center pixel. In the arrangement shown in FIG. 1, all eight pixels surrounding the center pixel of window 16 are used so the annular mean calculation requires a division by eight, after the sum of the eight pixel values $D_1$–$D_4$ and $D_5$–$D_8$, are obtained. Another way, which can be readily implemented for a window of the invention, involves adding the pixel values surrounding the center pixel in pairs, dividing the pair sums by two, adding the results by pairs, dividing such sums by two, and repeating such process until a single sum is obtained and again dividing by two. Each division by two is easily accomplished since the result of a division by two only requires that the least significant bit in the binary output not be used. While a small error is introduced, it is not significant. Similarly, groups of four of the pixel values surrounding the center pixel that are to be used can be added with the sum divided by four by not using the least and next significant bit in the binary output. The divide by two implementation approach for the circuit portion 18 is illustrated in FIG. 2 for a 3×3 window wherein four adders 25–28 are used to sum the pixel values in pairs for pixel values $D_1$–$D_8$ of window 16. While a single line is indicated for each input and output of the adders, since the pixel values are expressed with 8-bits, each input line is representative of eight input lines with an output lines representation of nine lines. Thus, $D_1$ and $D_2$ pixel values are added at adder 25, $D_2$ and $D_4$ at adder 26, $D_5$ and $D_6$ at adder 27 and $D_7$ and $D_8$ at adder 28 with a division by two carried out at the output of the adders 25–28 by not using the least significant bit (LSB) output when applying the output of adders 25 and 26 to an adder 29 and when applying the output of adders 27 and 28 to an adder 30. A division by two is similarly carried out at the output of adders 29 and 30 with the results being applied to adder 31 where a division by two is again carried out at the output 53 of adder 31 to provide the desired annular mean, $m_a$, value for the window. As can be seen from FIG. 2, all adders 25–31 are identical and are of minimum size and complexity. Further, it should be noted that all pixel values are processed in the same manner so that none of the pixel values are weighted disproportionately.

A selected number of the pixel values surrounding the center pixel of a pixel window are provided for calculation of the center deviation at the circuit portion 20. As has been indicated, all of the pixel values, $D_1$–$D_8$ and $D_c$, for the 3×3 window 16 of FIG. 1 are provided to the center deviation circuit portion 20 where the center deviation, $\sigma_c$, for the window 16 for each center pixel, $D_c$, that is present is determined. The center deviation, $\sigma_c$, is the sum of the absolute value of the differences between the center pixel and the selected surrounding pixels for a window. In the case of a 3×3 window, such as window 16, all pixels surrounding the center pixel are used. This involves the determination of eight differences which are summed. Expressed in equation form $$\sigma_c = \sum_{i=1}^{N} |D_i - D_c|; N = 8 \quad (7.1)$$

Figure 3:
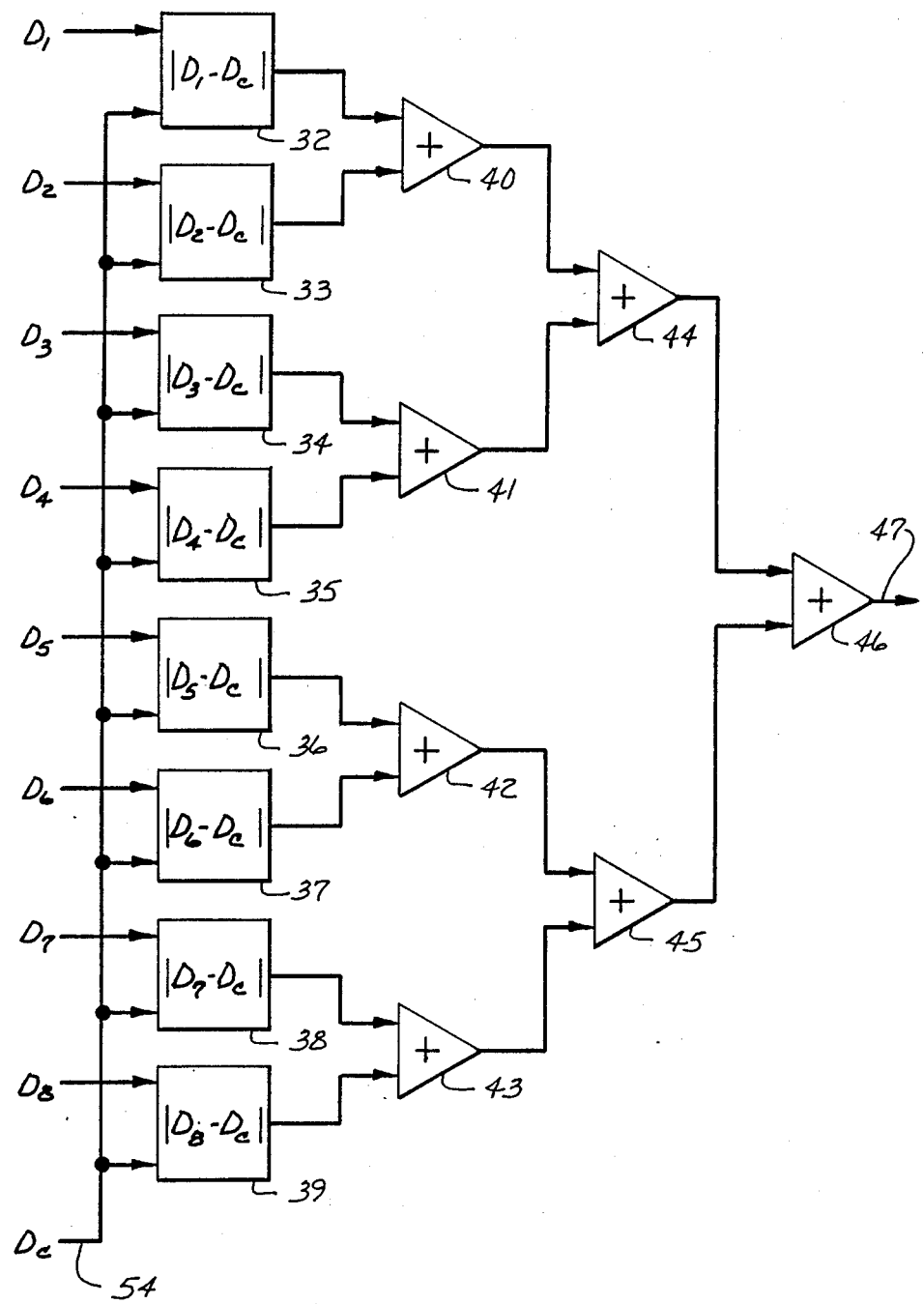
FIG. 3 is a schematic of circuitry usable for the center deviation circuit portion of FIG. 1.

FIG. 3 shows an exemplary circuit 20 for implementation of the calculation of the center deviation, $\sigma_c$, as set forth in equation (7.1). Eight binary subtractor circuits 32–39 are used to provide the absolute differences between the center pixel, $D_c$, and each of the surrounding pixels, $D_1$–$D_8$, for the 3×3 window 16. As in the case for the circuitry of FIG. 2, while a single line is shown for the inputs of the subtractors 32–39, each single line represents eight input lines, one for each of the 8-bits used for the pixel values. As can be seen, one input for each of the subtractors 32–39 is used for receiving the value of the center pixel, $D_c$, with subtractors 32–39 also receiving the values for pixels, $D_1$–$D_8$, respectively. Eight absolute differences are provided by the output from the subtractors 32–39 and the sum of such differences is determined using a number of adders 40–46. Specifically, adder 40 sums the output from subtractors 32 and 33, adder 41 sums the output from subtractors 34 and 35, adder 42 sums the output from subtractors 36 and 37 with adder 43 summing the output from subtractors 38 and 39. The output line for each of the adders 40–43 represents nine output lines. The sum provided at the output of adders 40 and 41 provides the input to adder 44 while the sum provided at the output of adders 42 and 43 provides the input to adder 45. The sum provided by ten output lines from adders 44 and 45 is applied to adder 46 for summing. The output 47 of adder 46, which requires eleven output lines, provides the center deviation, $\sigma_c$, signal.

The center deviation, $\sigma_c$, determined at 47 by the center deviation circuit 20 is used in a determination of the amount of modification or enhancement that is to be applied to the center pixel $D_c$. The center deviation, along with a gain control input 50, is used as the address for the look-up tables memory 22 that contains previously calculated values of the gain control. Compilation of the look-up tables takes into consideration the number of absolute differences obtained in the calculation of the center deviation. If this is not done, the center deviation determined at the circuit portion 20 is divided by such number to provide a center deviation mean. Such division to provide the center deviation means can be readily carried out by modifying circuitry of the form of FIG. 3 to obtain an output from adder 46 which only includes the output lines that are more significant than the output line having the most significant bit for the number of absolute differences that are obtained by such circuitry. Another possible modification, which would provide the center deviation means, would eliminate use of the least significant output line for the output of the adders 41–46 of FIG. 3, which for FIG. 3 would provide an output at the adder 46 that is equal to the sum of the differences provided by the subtractors 32–39 divided by the number of the subtractors, i.e., eight. If a division is not carried out for a determination of the center deviation, the resolution in $f(\sigma,C_g)$ is increased.

The greater the absolute value of the gain control, the more is the emphasis on image edges. The gain control obtained from the look-up tables is applied to the circuit portion 24 which provides for a calculation of the modified or enhanced center value pixel value, $D_c'$, in accordance with equation (6.1).

Figure 4:
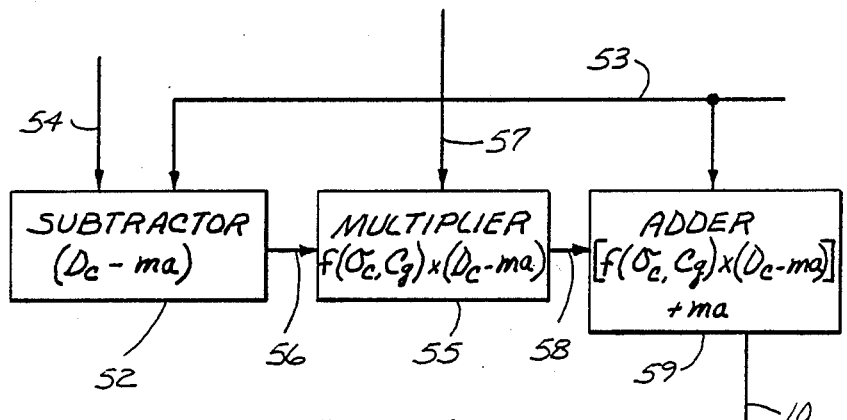
FIG. 4 is schematic in block diagram form of circuitry usable for the pixel modification circuit portion of FIG. 1.

The circuit portion 24 is shown in greater detail in FIG. 4 and includes a subtractor circuit 52 to which the annular mean, $m_a$, at 53 is provided along with the center pixel value, $D_c$, at 54 to subtract the annular mean, $m_a$, from the center pixel value, $D_c$. A multiply circuit 55 is also provided to which the output 56 of the subtractor 52 (including the sign bit) is applied along with the gain control value, $f(\sigma_c,C_g)$, supplied at 57 from the look-up tables memory 22 to provide the product of multiplying the gain control value, $f(\sigma_c,C_g)$ and the output, $(D_c-m_a)$, from the subtractor 52 which product is supplied at 58 to an adder 59 along with the annular mean, $m_a$, provided at 53 to provide the enhanced or modified center pixel value, $D_c'$, at its output 10. The enhanced or modified center pixel values presented at the output 10 of the pixel modification circuit 24 are useful for making an image where the process produces gray level images which are defined by the eight bit level signal for each pixel.

The digitally defined pixel can be used to provide an image on a bi-level basis, i.e., mark or no mark. This means the pixel values provided at the output 10 of the pixel modification circuit 24 must be thresholded to one bit. This can be done by using a threshold value the selection of which is based on a local background measurement. A comparison is then made between the threshold and the value of the enhanced center pixel, $D_c'$. If the enhanced center pixel value is greater than or equal to the selected threshold, an output is provided which can be used to cause a mark to be created on a medium for such pixel. If the selected threshold is less than the enhanced center pixel value, an output is provided which does not cause a mark to be created on a medium for such pixel. A useful measurement of the local background can be made by using the annular mean value that is determined by the annular mean circuit portion 18, for the center pixels of the pixel windows. In order to have a useful measurement of the background for a given pixel that has been enhanced, the annular mean values that are used must be close enough to the pixel in question and yet spread far enough apart.

Figure 5:
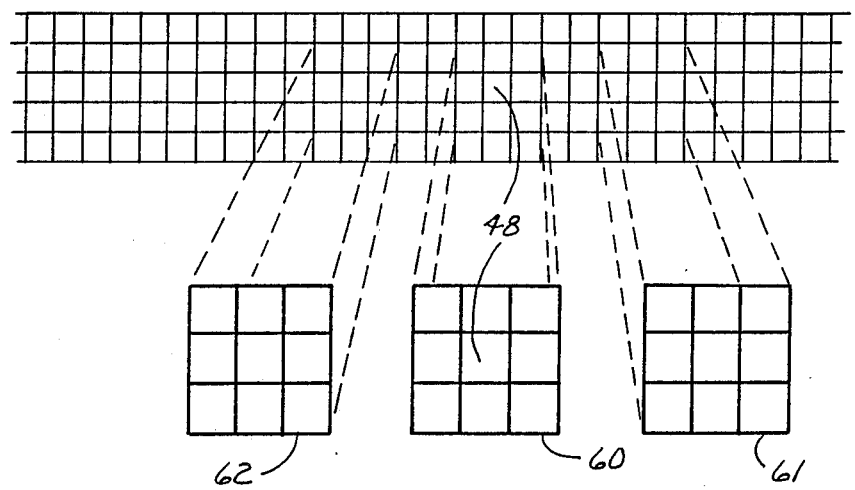
FIG. 5 is a showing of pixel windows usable for determining a background value for a center pixel of a window.

One such arrangement is schematically illustrated in FIG. 5 wherein three 3×3 windows are used, the window 60 having the center pixel 48 for which an enhanced value has been determined and is to be compared with a threshold value, a window 61 that is centered on a pixel that is five pixels ahead of the center pixel of window 60 and a window 62 that is centered on a pixel that is five pixels behind the pixel that is the center pixel of window 60. The average of the annular means determined for each of these three windows is usable as a measure of the background relative to the center pixel of window 60.

Figure 6:
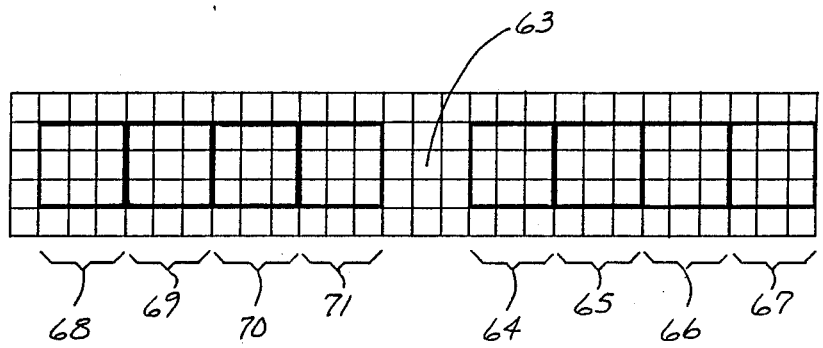
FIG. 6 is a showing of another use of pixel windows for determining a background value for a center pixel of a window.

Another arrangement that can be readily implemented with circuitry using the annular means for eight windows is schematically illustrated in FIG. 6. For the pixel at 63 for which a modified or enhanced value has been found and to be compared with a threshold value, the annular means for four 3×3 non-overlapping windows 64–67 ahead of pixel 63 is used along with the annular means for four 3×3 non-overlapping windows 68–71 behind the pixel 63. The average of the annular means for the eight non-overlapping windows 64–71 is determined and used as the background value for the pixel 63.

Figure 7:
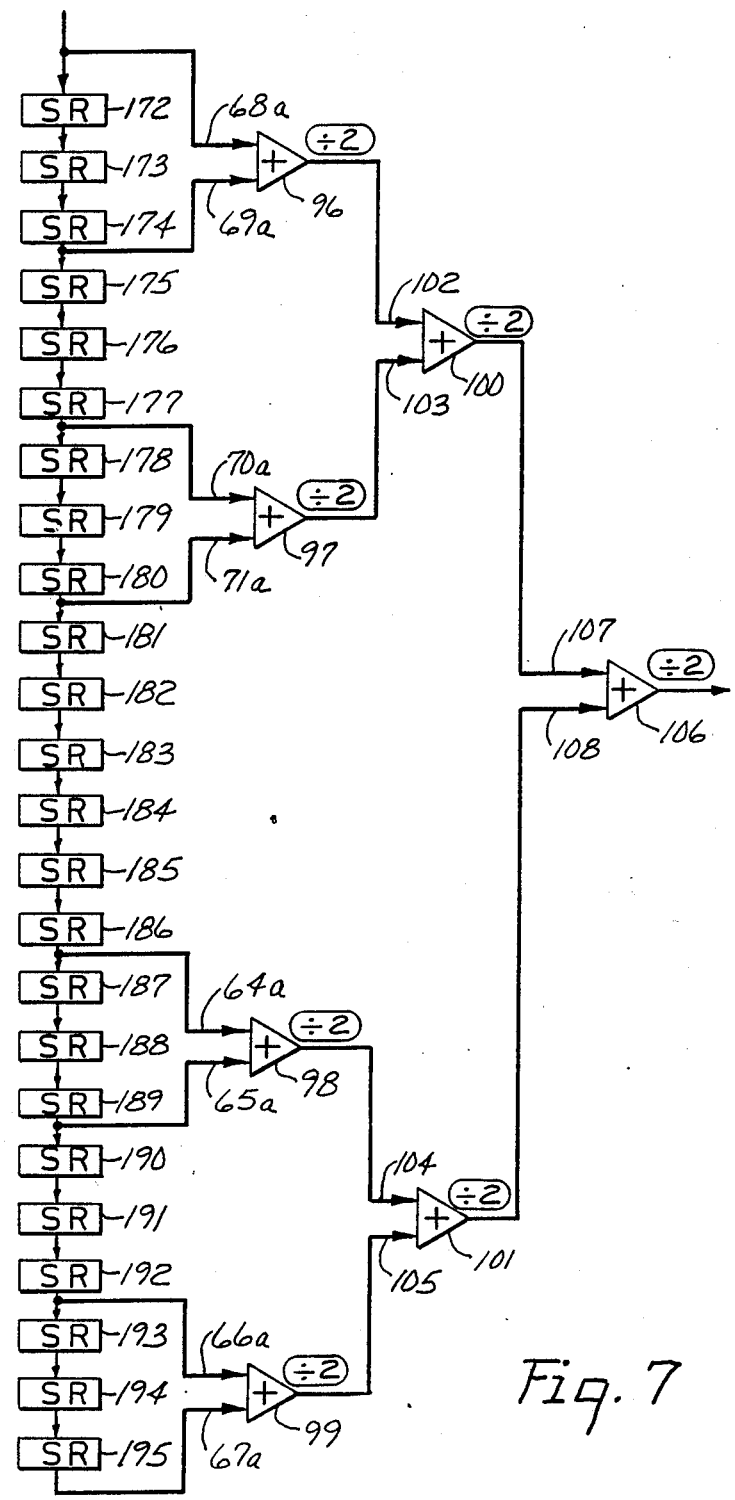
FIG. 7 is a schematic of circuitry for use as the background detection circuit portion of FIG. 1 wherein the pixel windows as set forth in FIG. 6 are used for determining background values.

Circuitry implementing the arrangement described in connection with FIG. 6 is shown in FIG. 7. As can be seen from FIG. 6, for the eight annular means for windows 64–71 to be available for averaging, twenty-four series connected shift registers 172–195 are used. Four adder circuits 96–99, each having two inputs for eight bit signals, are used to receive the annular mean for the windows 64–71. The input 68a of adder 96 receives the annular means for window 68 which is also presented to the shift register 172. This occurs when the input 67a for adder 99 is receiving the annular mean for window 67. The other input 69a for adder 96 which is connected to the output of shift register 174, is then receiving the annular mean for window 69. The annular mean for window 70 is then presented at the output of shift register 177 which is connected to the input 70a of adder 97. The other input 71a for adder 97, which is connected to the output of shift register 180, then receives the annular mean for window 71. The annular mean for window 64 is then presented at the output of shift register 186 which is connected to the input 64a of adder 98. The other input 65a for adder 98, which is connected to the output of shift register 189, then receives the annular mean for window 65. The annular mean for window 66 is then presented at the output of shift register 192, which is connected to the input 66a of adder 99. The circuitry of FIG. 7 also includes adders 100 and 101. The least significant bit output line of the nine line output of adder 96 is not connected to the input 102 of adder 100 so that the sum of the annular mean for windows 68 and 69 provided by adder 96 is divided by two and supplied to adder 100. The output of adder 97 is similarly connected to the other input 103 of adder 100. Similarly, the outputs of adder 98 and adder 99 are connected to the inputs 104 and 105, respectively, of adder 101. An adder 106 is also included, which has its inputs 107 and 108 similarly connected to the output of adders 100 and 101, respectively. The output of adder 106 does not include the least significant bit of the sum of the two inputs causing the output to be the average of the eight annular means for windows 64–71. It should be noted that the portion of the circuitry that includes the adders 96–106 to obtain an average of eight inputs is similar in structure and function as the portion of the circuitry for FIG. 2 wherein adders 25–31 are used to obtain the average of eight inputs.

Referring to FIG. 1, circuitry for thresholding the enhanced pixel output 10 from the circuit portion 24 to permit its use for the production of an image on a bilevel bases includes a background detection circuit portion 110, a memory 111 of threshold value look-up tables, a comparator 112, a delay circuit 113, and an inverter 115. The background detection circuit portion 110 can take the form of the circuitry described in connection with FIG. 7. The background detection circuit portion 110 receives the annular means, $m_a$ from the annular means circuit portion 18 to provide a background value for each enhanced pixel value obtained from the pixel modification circuitry. The background value is used as an address for the threshold value look-up table in memory 111 that is selected by a table selection input 116 to the memory 111. The threshold eight bit value obtained from memory 111 is applied to one eight bit input of the comparator 112 which receives each enhanced pixel value at its other eight bit input from the pixel modification circuit 24 via a delay circuit 113. The delay circuit 113 provides the delay necessary to have the pixel valued supplied to the comparator 112, at the time the background value is provided for such pixel value. The amount of delay provided by the delay circuit 113 is dependent on the manner in which the background value is determined at the background detection circuit 110 and also the method of obtaining $D_c'$. The comparator 112 will provide one output of one bit if the enhanced pixel value exceeds or is equal to the threshold value for the pixel value supplied to the comparator 112 and will provide a different output of one bit if the enhanced pixel value is less than such threshold value. The output of the comparator 112 is supplied to the inverter 115 which passes the output from the comparator 112 and or inverts it according to an output control 117 supplied to the inverter 115. If the output of the comparator 112 provided when the pixel value is greater than or equal to the threshold value is passed by the inverter 115, it can be used with an imaging process to produce a mark and if such output from the comparator 112 is inverted it will not produce a mark when used with an imaging progress. Similarly, if the inverter 115 passes the output of the comparator 112 that is provided when the enhanced pixel value is less than the threshold, it will not produce a mark when used with an imaging process. However, if such output from the comparator 112 is inverted by the inverter 115, it will produce a mark when used in an imaging process.

Figure 8:
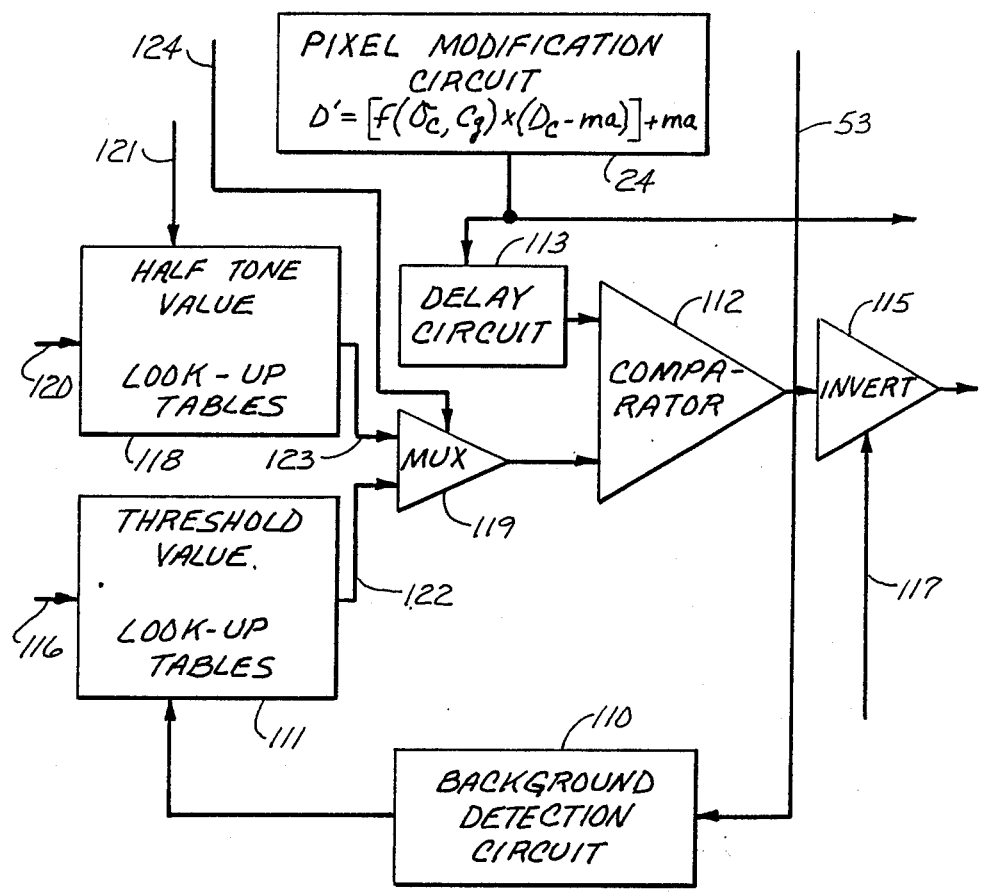
FIG. 8 shows a portion of FIG. 1 which is modified to include half-toning.
Figure 9:
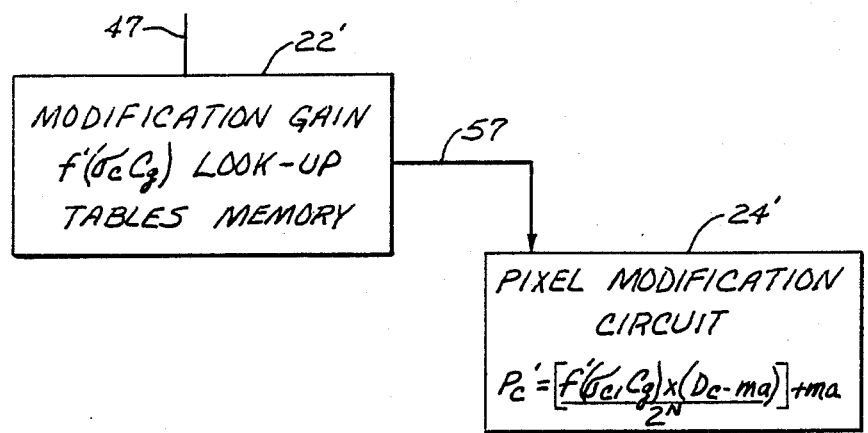
FIG. 9 is a modified portion of the system of FIG. 1 for increase resolution.

FIG. 8 shows a modification to the portion of FIG. 1 just described. The modification allows the enhanced pixel value obtained from the circuit portion 24 to be used to make a one bit signal based on a halftone method, if desired. The modification includes the addition of a memory 118 and a multiplexer 119. The memory 118 has halftone value look-up tables. Selection of a halftone value is determined by a table selection input 120 for the memory 118 along with an address based on pixel and line counts supplied for an address input 121 for the memory 118. The multiplexer 119 receives the output at 122 from memory 111 and the output at 123 from memory 118. A control 124 is provided at the multiplexer 119 to select which of the inputs 122 and 123 from memories 111 and 118, respectively, will pass to one of the eight bit inputs to comparator 112.

While a 3×3 pixel window 16 is used in FIG. 1, it should be understood that the 3×3 size window was selected only for purposes of illustration. It is only necessary that any window that is used have certain characteristics. Windows of a greater size, of course, require additional circuit elements for processing the larger number of pixel values that are involved. The advantages provided by the invention presented herein are obtained with pixel windows which have a center pixel with the surrounding pixels used to determine the annular mean and center deviation being of a number that can be expressed as a power of two. For example, a 5×5 window can be used if the following pixel values are not applied to the annular mean 18: the first two and the last pixel value in row one; the last pixel value of row two; the first pixel value of row four and the first and last two pixel values of row five. This means eight outer pixel values are not used to calculate the annular mean for a given center pixel with sixteen ($2^4$) pixel values surrounding the center pixel value being used. A 7×7 pixel window is also usable if four pixel values in each corner of the window are not used to calculate the annular mean With sixteen pixels not utilized, thirty-two ($2^5$) pixel values surrounding the center pixel are used to calculate the annular mean. If the same pixel windows for a 9×9 window are not used, such a window is suitable since sixty-four ($2^6$) pixel values surrounding the center pixel are then used to calculate the annular mean. A 13×13 3 pixel window is also usable. In this case, in the first and last row only pixel values at positions six and eight are used and in columns one and thirteen, only pixel values at positions six and eight are used. With this configuration, one hundred-twenty-eight ($2^7$) pixel values surrounding the center pixel are used to calculate the annular mean. As another example, a 17×17 pixel window is usable if eight pixels in each corner of the window are not used so that two hundred-fifty-six ($2^8$) pixel values surrounding the center pixel are used to calculate the annular mean. Referring to the upper left corner of such a window, it is preferred that the eight pixel values not used for such corner be the first four of the first row; the first two of the second row and the first pixel in of rows three and four. The eight pixel values not used in the other three corners are selected to provide the same sort of configuration for such corners. A suitable pixel window need not have the same number of rows and columns. For example, a 5×7 pixel window is suitable if two pixels that are at opposite corners are not used for the annular means calculation so that thirty-two ($2^5$) pixel values surrounding the center pixel are used to calculate the annular mean. The foregoing examples illustrate how other still larger pixel windows could be used, if desired.

While all pixel values provided by a pixel window are available for use in calculating the center deviation at the circuit portion 20, only a selected number of the available pixel values need be used with the selected number being taken into consideration when the modification gain look-up tables are compiled. For example, the pixel value selected may be only those falling within a circle of a selected radius drawn on a representation of the pixel window with the center pixel as the center which may give a more accurate center deviation measurement for a particular pixel window.

The description given earlier regarding the use of the center deviation, $\sigma_c$, determined by the center deviation circuit 20 for determining the amount of modification or enhancement that is to be applied to the center pixel, $D_c$, indicated that compilation of the look-up tables for memory 22 takes into consideration the number of absolute differences obtained in the calculation of the center deviation. Accordingly, a division that would otherwise be carried out at the circuit portion 20 is postponed and considered when compiling the look-up tables for memory 22. This results in greater resolution in the determination of the modification gain at 22 as no fractions are dropped or lost at the circuit portion 20, which would be the case if a division was carried out at the circuit portion 20. Improved resolution is obtained, if such division is not taken into account in the compilation of the look-up tables for memory 22, and the compilation of the look-up tables for memory 22 is made to consider a division to be done by the pixel modification circuitry following the look-up table memory for the modification gain. It is preferred that any division done at pixel modification circuitry be by a number whereby the division can be readily accomplished, for example, division by $2^N$, where N is an integer equal 0 or more. N equal to three or four is preferred. Division by the pixel modification circuitry requires a change in the circuitry shown in FIG. 1 and 4 The necessary changes are reflected in circuit portions 22' and 24' of FIG. 10 which are used in place of circuit portions 22 and 24 of FIG. 1. Circuit portion 22' differs from portion 22 in that the look-up table values are different. Thus, the modification gain in portion 22' is indicated as f'($\sigma_c$, $C_g$) rather than f($\sigma_c,C_g$) as rather than f($\sigma_c,C_g$) as indicated in portion 22 of FIG. 1. the equation for the output of portion 24' shows a division by $2^N$ so that $$D'_c = \frac{[f'(\sigma_c,C_g) \times (D_c - m_a)]}{2^N} + m_a.$$

Figure 10:
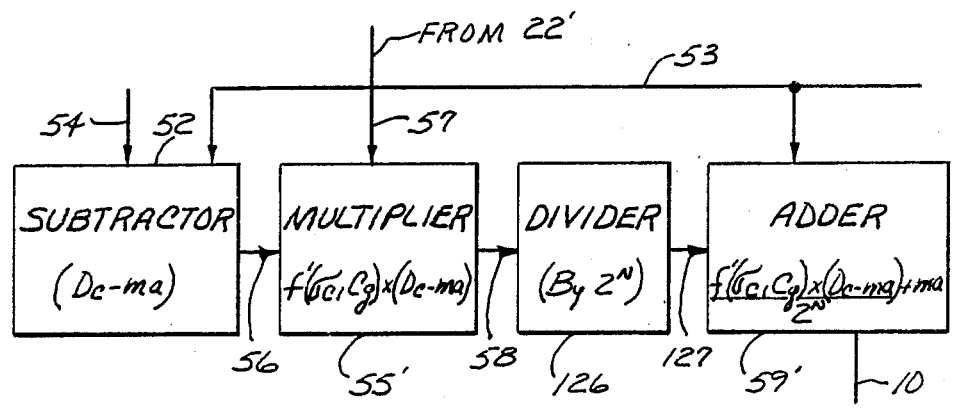
FIG. 10 is a schematic of circuitry in block diagram form usable for the pixel modification circuit portion of FIG. 9.

Referring to FIG. 10, it differs from FIG. 4 in that he multiplier 55' reflects a multiplication of f'($\sigma_c,C_g$) x ($D_c$-$m_a$) rather than a multiplication of f($\sigma_c,C_g$) x ($D_c$-$m_a$) as shown for the multiplier 55 of FIG. 1. In addition, the output 58 of multiplier 55' is applied to a divider 126, where the result obtained from multiplier 55, is divided by $2^N$, N being an integer equal to 0 or greater with 3 or 4 preferred. Unlike adder 59 of FIG. 1, adder 59' of FIG. 10 receives the output 127 of adder 126 as an input rather than having an input from a multiplier circuit as in FIG. 1. The output 10 from adder 59', which also receives the value of m via 53, is the value for $D_c'$ as reflected by the equation shown in 59' which corresponds to the equation shown in block 24' of FIG. 10.

It should also be appreciated that the annular mean, $m_a$, for a center pixel, $D_c$, has application for the modification of such pixel without being limited to the particular manner in which the gain modification is obtained from the center pixel $D_c$ and selected pixels of the pixel window. Thus, if the gain modification is given the general designation, g, the equation for the modified center pixel, $D_c'$, wherein the annular mean, $m_a$, is used, can be expressed as follows:

$$D_c' = [g \times (D_c - m_a)] + m_a$$

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

I claim:

1. A system for modifying pixels supplied to the system that are multiple level signals for a digitized image including:
    means providing a moving pixel window from pixels supplied to the system, said pixel window having a center pixel, $D_c$ and at least $2^N$ pixels surrounding said center pixel, where N is an integer of 1 or more;
    means receiving $2^N$ pixels of said pixels surrounding said center pixel for providing the annular mean, $m_a$, of said received $2^N$ pixels;
    means receiving said center pixel and selected for providing an output based on the center deviation $\sigma_c$, for said center pixel; and
    means connected to said output for obtaining a modification gain, $f(\sigma_c, C_g)$; and
    means receiving said center pixel, $D_c$, said annular means, $m_a$, and said modification gain, $f(\sigma_c, C_g)$ for providing a modified center pixel, $D_c'$, in accordance with the following equation:

$$D_c' = [f(\sigma_c, C_g) \times (D_c - m_a)] + m_a.$$

2. A system according with claim 1 wherein said means connected to said output is a memory containing modification gain look-up tables.

3. A system according to claim 1 wherein said output based on the center deviation is equal to the center deviation divided by the number of selected pixels.

4. A system according to claim 1 further including:
    a background detection circuit portion receiving said annular mean for providing an output that is a measure of the background for said modified center pixel;
    means connected to said output of said background detection circuit portion for obtaining a threshold value; and
    a comparator receiving said threshold value at one input of said comparator and said modified center pixel at a second input of said comparator for which a measure of its background is provided by said background detection circuit, said comparator providing one output signal when said modified center pixel at said second input exceeds or is equal to said threshold value at said one input and providing a different output signal when said modified center pixel is less than said threshold value.

5. A system according to claim 4 wherein said means for obtaining a threshold value is a memory containing threshold value look-up tables.

6. A system according to claim 1 further including:
    a memory containing look-up tables of half tone values; and
    a comparator for receiving a half tone value from said memory at one input of said comparator and said modified center pixel at a second input of said comparator, said comparator providing one output signal when said modified center pixel at said input exceeds or is equal to said half tone value at said one input and providing a different output signal when said modified center pixel is less than said half tone value at said one input.

7. A system for modifying pixels supplied to the system that are multiple level signals for a digitized image including:
    means providing a moving pixel window from pixels supplied to the system, said pixel window having a center pixel, $D_c$, and at least $2^N$ pixels surrounding said center pixel, wherein N is an integer of 1 or more;
    means receiving $2^N$ of said pixels surrounding said center pixel for providing the annular mean, $m_a$, of said received $2^N$ pixels, said annular means being the single result obtained by repeating a process of addition of two sets of values and the division by two of each such additions, such process beginning with the addition of the values of each set of two pixels of said $2^n$ pixels;
    means receiving said center pixel, $D_c$, and selected pixels of said pixel window surrounding said center pixel for providing a modification gain, g, and receiving said annular means, $m_a$, for providing a modified center pixel, $D_c'$, in accordance with the following equation:

$$D_c' = ]g \times (D_c - m_a)] + m_a.$$

8. A system according to claim 7 further including:
    a background detection circuit portion receiving said annular mean for providing an output that is a measure of the background for said modified center pixel;
    means connected to said output of said background detection circuit portion for obtaining a threshold value;
    a comparator receiving said threshold value at one input of said comparator and said modified center pixel at a second input of said comparator for which a measure of its background is provided by said background detection circuit, said comparator providing one output signal when said modified center pixel at said second input exceeds or is equal to said threshold value at said one input and providing a different output signal when said modified center pixel is less than said threshold value.

9. A system according to claim 8 wherein said means for obtaining a threshold value is a memory containing threshold value look-up tables.

10. A system according to claim 7 further including:
    a memory containing look-up tables of half tone values; and
    a comparator for receiving a half tone value from said memory at one input of said comparator and said modified center pixel at a second input of said comparator, said comparator providing one output signal when said modified center pixel at said input exceeds or is equal to said half tone value at said one input and providing a different output signal when said modified center pixel is less than said half tone values at said one input.

11. A method for modifying pixels that are multiple level signals for a digitized image including the steps of:
    (a) establishing a moving pixel window from the pixels wherein said pixel window has a center pixel, $D_c$ and at least $2^N$ pixels surrounding said center pixel, where N is an integer of 1 or more;
    (b) determining the annular mean, $m_a$, of $2^N$ pixels of said pixels surrounding said center pixel for each established pixel window;

(c) determining the center deviation for the center pixel of each established pixel window using selected pixels of the pixel window surrounding the center pixel;

(d) establishing a modification gain, $f(\sigma_c, C_g)$, for each center pixel based on the center deviation; and (e) processing the annular mean, $m_a$, the center pixel, $D_c$, and the modification gain, $f(\sigma_c, C_g)$, to produce a modified center pixel, $D_c'$, in accordance with the following equation:

$$D_c' = [F(\sigma_o C_g) \times (D_c - m_a)] + m_a.$$

12. A method for modifying pixels that are multiple level signals for a digitized image according to claim 11 wherein the step of establishing a modification gain, $f(\sigma_c, C_g)$, includes providing a memory containing modification gain look-up tables and using said center deviation for addressing said memory to establish said modification gain.

13. A method for modifying pixels that are multiple level signals for a digitized image according to claim 11 wherein the step of establishing a modification gain, $f(\sigma_c, C_g)$, based on the center deviation includes division of the center deviation by number of selected pixels used to determine the center deviation and using the result for establishing said modification gain.

14. A method for modifying pixels that are multiple level signals for a digitized image according to claim 11 including the additional steps of (f) using the annular mean, $m_a$, to provide a measure of the background for said modified center pixel;

(g) establishing a threshold value based on the said measure of the background;

(h) comparing said threshold value with said modified pixel and providing one signal if said modified pixel is greater or equal to the threshold value and providing a different signal if said modified pixel is less than said threshold value.

15. A method of modifying pixels that are multiple level signals for a digitized image according to claim 14 wherein step (g) includes providing a memory containing threshold value look-up tables and using said measure of the background for addressing said memory to establish said threshold value.

16. A method for modifying pixels that are multiple level signals for a digitized image according to claim 11 including the additional steps of (f) providing a memory containing look-up tables of half tone values; and (g) comparing a half tone value obtained from said memory and providing one signal if said modified pixel is greater or equal to said half tone value and providing a different signal if said modified pixel is less than said half tone value.

17. A system for modifying pixels supplied to the system that are multiple level signals for a digitized image including:

means providing a moving pixel window from pixels supplied to the system, said pixel window having a center pixel, $D_c$ nd at least $2^N$ pixels surrounding said center pixel, where N is an integer of 1 or more;

means receiving $2^N$ pixels of said pixels surrounding said center pixel for providing the annular mean, $m_a$, of said received $2^N$ pixels;

means receiving said center pixel and selected pixels of said pixel windows surrounding said center pixel for providing an output based on the center deviation $\sigma_c$, for said center pixel; and connected to said output for obtaining a modification gain, $f'(\sigma_c, C_g)$; and means receiving said center pixel, $D_c$, said annular means, $m_a$, and said modification gain, $f(\sigma_c, C_g 0$ for providing a modified center pixel, $D_c'$, in accordance with the following equation:

$$D_c' = \frac{[f'(\sigma_c, C_g) \times (D_c - m_a)]}{2^N} + m_a,$$

where N is an integer of 0 or more.

18. A system according to claim 17 wherein said means connected to said output is a memory containing modification gain look-up tables.

19. A system according to claim 17 further including:

a background detection circuit portion receiving said annular mean for providing an output that is a measure of the background for said modified center pixel;

means connected to said output of said background detection circuit portion for obtaining a threshold value; and a comparator receiving said threshold value at one input of said comparator and said modified center pixel at a second input of said comparator for which a measure of its background is provided by said background detection circuit, said comparator providing one output signal when said modified center pixel at said second input exceeds or is equal to said threshold value at said one input and providing a different output signal when said modified center pixel is less than said threshold value.

20. A system according to claim 19 wherein said means for obtaining a threshold value is a memory containing threshold value look-up tables.

21. A system according to claim 17 further including:

a memory containing look-up tables of half tone values; and a comparator for receiving a half tone value from said memory at one input of said comparator and said modified center pixel at a second input of said comparator, said comparator providing one output signal when said modified center pixel at said input exceeds or is equal to said half tone value at said one input and providing a different output signal when said modified center pixel is less than said half tone value at said one input.

22. A method for modifying pixels that are multiple level signals for a digitized image including the steps of:

(a) establishing a moving pixel window from the pixels wherein said pixel window has a center pixel, $D_c$ and at least $2^N$ pixels surrounding said center pixel, where N is an integer of 1 or more:

(b) determining the annular mean, $m_a$, of $2^N$ pixels of said pixels surrounding said center pixel for each established pixel window;

(c) determining the center deviation for the center pixel of each established pixel windows using selected pixels of the pixel window surrounding the center pixel;

(d) establishing a modification gain, $f'(\sigma_c, C_g)$, for each center pixel based on the center deviation; and (e) processing the annular means, $m_a$, the center pixel, $c$, and the modification gain, $f'(\sigma_c, C_g)$ to produce a modified center pixel, $D_c'$, in accordance with the following equation:

$$D_c' = \frac{[f'(\sigma_c, C_g) \times (D_c - m_a)]}{2^N} + m_a,$$

where N is an integer of 0 or greater.

23. A method for modifying pixels that are multiple level signals for a digitized image according to claim 22 wherein the step of establishing a modification gain, $f'(\sigma_c, C_g)$ includes providing a memory containing modification gain look-up tables and using said center deviation for addressing said memory to establish said modification gain.

24. A method for modifying pixels that are multiple level signals for a digitized image according to claim 22 including the additional steps of
 (f) using the annular mean, $m_a$, to provide a measure of the background for said modified center pixel;
 (g) establishing a threshold value based on the said measure of the background;
 (h) comparing said threshold value with said modified pixel and providing one signal if said modified pixel is greater or equal to the threshold value and providing a different signal if said modified pixel is less than said threshold value.

25. A method of modifying pixels that are multiple level signals for a digitized image according to claim 24 wherein step (g) includes providing a memory containing threshold value look-up tables and using said measure of the background for addressing said memory to establish said threshold value.

26. A method for modifying pixels that are multiple level signals for a digitized image according to claim 22 including the additional steps of
 (f) providing a memory containing look-up table of half tone values; and
 (g) comparing a half tone value obtained from said memory and providing one signal if said modified pixel is greater or equal to said half tone value and providing a different signal if said modified pixel is less than said half tone value.

27. A method for modifying pixels that are multiple level signals for a digitized image including the steps of:
 (a) establishing a moving pixel window from the pixels wherein said pixel window has a center pixel, $D_c$ and at least $2^N$ pixels surrounding said center pixel, where N is an integer of 1 or more;
 (b) determining the annular means, $m_a$, of $2^n$ pixels of said pixels surrounding said center pixel for each established pixel window by repeating a process of addition of two sets of values and the division by two of each such additions, such process beginning with the addition of the values of each set of two pixels of said $2^N$ pixels to create a single result which is said annular means;
 (c) establishing a modification gain, g, from the center pixel, $D_c$, and selected pixels of said window surrounding said center pixel;
 (d) processing the annular mean, $m_a$, the center pixel $D_c$, and the modification gain, g, to produce a modified center pixel, $D_c'$, in accordance with the following equation:

$$D_{c'} = [g \times (D_c - m_a)] = m_a.$$

28. A method for modifying pixels that are multiple level signals for a digitized image according to claim 27 including the additional steps of
 (e) using the annular mean, $m_a$, to provide a measure of the background for said modified center pixel;
 (f) establishing a threshold value based on the said measure of the background;
 (g) comparing said threshold value with said modified pixel and providing one signal if said modified pixel is greater or equal to the threshold value and providing a different signal if said modified pixel is less than said threshold value.

29. A method of modifying pixels that are multiple level signals for a digitized image according to claim 28 wherein step (f) includes providing a memory containing threshold value look-up tables and using said measure of the background for addressing said memory to establish said threshold value.

30. A method for modifying pixels that are multiple level signals for a digitized image according to claim 27 including the additional steps of
 (f) providing a memory containing look-up tables of half tone values; and
 (g) comparing a half tone value obtained from said memory and providing one signal if said modified pixel is greater or equal to said half tone value and providing a different signal if said modified pixel is less than said half tone value.

31. A background detection circuit for a system for modifying pixels supplied to the system that are multiple level signals for a digitized image wherein the system has means providing a moving pixel window from pixels supplied to the system, with the pixel Window having a center pixel, $D_c$, and at least $2^N$ pixels surrounding the center pixel, when N is an integer of 1 or more plus means receiving $2^N$ pixels of said pixels surrounding the center pixel for providing the annular mean, $m_a$, of the received $2^n$ pixels, the background detection circuit including:
 means accessing the annular mean for a number of non-overlapping pixel windows preceding a center pixel, $D_c$, and for a number of non-overlapping pixel windows following said center pixel, $D_c$, and
 means for determining the average of the annular means accessed by said last-mentioned means, said average providing a measure of the background of the center pixel, $D_c$.

* * * * *

UNITED STATES PATENT AND TRADEMARK OFFICE
CERTIFICATE OF CORRECTION

PATENT NO. : 4,941,190

DATED : July 10, 1990

INVENTOR(S) : Terrence H. Joyce

It is certified that error appears in the above-identified patent and that said Letters Patent is hereby corrected as shown below:

Col. 15, line 16, after "selected" insert --pixels of said pixel window surrounding said center pixel--.

Col. 16, line 24, "]g x $(D_c - m_a)$] + $m_a$." should read --[g x $(D_c - m_a)$] + $m_a$.--

Col. 16, line 34, after "value" insert --and--

Col. 17, line 12, after " = [F $(o_c\ C_g)$ X " should read --
$D_c' = [f(\sigma_c, C_g) \times (D_c - m_a)] + m_a.$ --

Col. 18, line 3, "before the word "connected" should read --means connected to--

Col. 18, line 5, "sald annular" should read --said annular--

Col. 18, line 68, "$_c$, and the modification gain", should read --$D_c$, and the modification gain--

Signed and Sealed this

Twenty-ninth Day of September, 1992

*Attest:*

DOUGLAS B. COMER

*Attesting Officer*     *Acting Commissioner of Patents and Trademarks*